(12) United States Patent
Takemura et al.

(10) Patent No.: US 9,239,256 B2
(45) Date of Patent: Jan. 19, 2016

(54) FLOW-RATE MEASUREMENT DEVICE

(75) Inventors: Kouichi Takemura, Nara (JP); Yasuo Koba, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 137 days.

(21) Appl. No.: 13/821,879

(22) PCT Filed: Oct. 20, 2011

(86) PCT No.: PCT/JP2011/005871
§ 371 (c)(1),
(2), (4) Date: Mar. 8, 2013

(87) PCT Pub. No.: WO2012/053209
PCT Pub. Date: Apr. 26, 2012

(65) Prior Publication Data
US 2013/0167656 A1    Jul. 4, 2013

(30) Foreign Application Priority Data

Oct. 22, 2010 (JP) ................................ 2010-236996

(51) Int. Cl.
*G01F 1/66* (2006.01)
(52) U.S. Cl.
CPC *G01F 1/66* (2013.01); *G01F 1/667* (2013.01); *G01F 1/668* (2013.01)
(58) Field of Classification Search
CPC ............ G01F 1/667; G01F 1/668; G01F 1/66
USPC .................. 702/45, 48, 50; 73/861.27, 861.28
See application file for complete search history.

(56) References Cited

U.S. PATENT DOCUMENTS 3,575,050 A * 4/1971 Lynnworth ................. 73/861.27
5,419,189 A * 5/1995 Lew et al. ........................ 73/195
(Continued)

FOREIGN PATENT DOCUMENTS

DE  102004023147 A1  11/2005
EP      1193476 A1   4/2002
(Continued)

OTHER PUBLICATIONS

International Search Report for International Application No. PCT/JP2011/005871, dated Jan. 10, 2012, 4 pages.
(Continued)

*Primary Examiner* — Alexander Satanovsky
(74) *Attorney, Agent, or Firm* — Brinks Gilson & Lione

(57) ABSTRACT

A flow-rate measurement device includes a first transducer and a second transducer which are provided in a fluid flow path to transmit and receive an ultrasonic signal, a timer unit which measures a propagation time of the ultrasonic signal propagating between the first transducer and the second transducer, and a flow-rate calculation unit which executes a unit measurement step a predetermined number of times and calculates a flow rate of a fluid flowing in the fluid flow path on the basis of the propagation times measured the predetermined number of times, the unit measurement step being an operation in which a direction of transmission to reception between the first transducer and the second transducer is switched and the timer unit measures the propagation times of the ultrasonic signal in both directions. The flow-rate calculation unit measures a flow rate value of the fluid by a precise measurement step in which the unit measurement step is executed a plural number of times to calculate the flow-rate and an exploratory measurement step in which the unit measurement step is executed a smaller number of times than the number of executions in the precise measurement step to calculate the flow rate.

7 Claims, 6 Drawing Sheets

(56) References Cited

U.S. PATENT DOCUMENTS

| | | | |
|---|---|---|---|
| 6,748,812 B1 * | 6/2004 | Takemura et al. | 73/861.29 |
| 7,552,652 B2 * | 6/2009 | Frohlich et al. | 73/861.28 |
| 2007/0039399 A1 * | 2/2007 | Groeschel | 73/861.27 |
| 2008/0148866 A1 | 6/2008 | Frohlich et al. | |
| 2008/0289434 A1 * | 11/2008 | Takemura et al. | 73/861.27 |
| 2011/0246098 A1 | 10/2011 | Takemura et al. | |
| 2012/0185183 A1 * | 7/2012 | Takemura et al. | 702/48 |

FOREIGN PATENT DOCUMENTS

| | | |
|---|---|---|
| JP | 2000-146648 A | 5/2000 |
| JP | 2002-350202 A | 12/2002 |
| JP | 2003-028685 A | 1/2003 |
| JP | 2003-028688 A | 1/2003 |
| JP | 3427839 B1 | 7/2003 |
| JP | 2003-222548 A | 8/2003 |
| JP | 2003-247877 A | 9/2003 |
| JP | 2004-069532 A | 3/2004 |
| JP | 2004-340711 A | 12/2004 |
| JP | 2007-286076 A * | 11/2007 ............. G01F 1/66 |
| JP | 2007-286076 A | 11/2007 |
| JP | 2010-160005 A | 7/2010 |
| JP | 2010-181401 A | 8/2010 |
| WO | WO 00/70313 A1 | 11/2000 |

OTHER PUBLICATIONS

Extended Search Report for Corresponding European application serial No. 11834055.3, dated Jul. 16, 2014, 6 pages.

* cited by examiner

FLOW-RATE MEASUREMENT DEVICE

This application is a 371 application of PCT/JP2011/005871 having an international filing date of Oct. 20, 2011, which claims priority to JP2010-236996 filed Oct. 22, 2010, the entire contents of which are incorporated herein by reference.

TECHNICAL FIELD

The present invention relates to a flow-rate measurement device which measures the propagation time of an ultrasonic signal to measure the flow rate of a fluid from the flow velocity of the fluid.

BACKGROUND ART

In the related art, a flow-rate measurement device using a so-called sing-around method, which repeats transmission/reception between two transducers multiple times to increase measurement resolution, has been suggested.

Hereinafter, an example of a flow-rate measurement device of the related art which is applied to a household gas meter will be described with reference to FIG. 6.

FIG. 6 is a block diagram of a flow-rate measurement device using a sing-around method of the related art. As shown in FIG. 6, the flow-rate measurement device includes first transducer 42 and second transducer 43 which are provided in fluid path 41, measurement unit 44, control unit 45, and calculation unit 46. First transducer 42 which transmits (sends) an ultrasonic wave and second transducer 43 which receives the transmitted ultrasonic wave are arranged to be opposite to each other in the flow direction of a fluid flowing in fluid path 41. Measurement unit 44 measures the propagation time of an ultrasonic wave which propagates between first transducer 42 and second transducer 43. Control unit 45 controls measurement unit 44. Calculation unit 46 calculates the flow rate of the fluid flowing in the fluid path 41 on the basis of the result of the measurement of measurement unit 44.

Hereinafter, a method which calculates the flow rate of the fluid flowing in fluid path 41 will be described. As shown in FIG. 6, the sound speed is referred to as C, the flow velocity of the fluid is referred to as v, the distance between first transducer 42 and second transducer 43 is referred to as L, and the angle between the propagation direction of the ultrasonic wave and the flow direction is referred to as θ.

The propagation time when an ultrasonic wave is transmitted from first transducer 42 arranged on the upstream side of fluid path 41 and is received by second transducer 43 arranged on the downstream side is referred to as t12. The propagation time in the reverse direction of the fluid flow when an ultrasonic wave is transmitted from second transducer 43 arranged on the downstream side of fluid path 41 and is received by first transducer 42 arranged on the upstream side is referred to as t21.

At this time, the propagation time t12 and the reverse propagation time t21 are obtained by the following expressions.

$$t12 = L/(C + v \cos\theta) \quad \text{(Expression 1)}$$

$$t21 = L/(C - v \cos\theta) \quad \text{(Expression 2)}$$

Next, if (Expression 1) and (Expression 2) are modified, the flow velocity v of the fluid is obtained from (Expression 3).

$$v = L \cdot (1/t12 - 1/t21)/2 \cos\theta \quad \text{(Expression 3)}$$

The cross-sectional area of fluid path 41 is multiplied to the value of the fluid velocity obtained by (Expression 3) to obtain the flow rate of the fluid. At this time, the term in parentheses of (Expression 3) may be modified as (Expression 4).

$$(t21 - t12)/t12 \cdot t21 \quad \text{(Expression 4)}$$

While the denominator term of (Expression 4) substantially has a constant value regardless of change in the flow velocity of the fluid, the numerator term of (Expression 4) substantially has a value proportional to the flow velocity of the fluid.

Accordingly, in order to accurately measure the flow velocity of the fluid, it is necessary to measure the difference between the propagation time t12 and the reverse propagation time t21 with satisfactory accuracy. That is, it is necessary to obtain a minute difference in the propagation time as the flow velocity of the fluid becomes lower. For this reason, when measuring the difference between the propagation time t12 and the reverse propagation time t21 singly, measurement unit 44 should have performance so as to execute a measurement, for example, with time resolution of nanosecond (ns) order.

However, it is usually difficult to realize time resolution of nanosecond (ns) order. For example, even if the time resolution of nanosecond (ns) order is realized, there is a problem in which power consumption increases due to high-speed processing.

Accordingly, in order to solve the above-described problem, usually, a flow-rate measurement device has been developed in which transmission/reception of an ultrasonic wave is first repetitively executed a plural number of times to repetitively measure the propagation time by measurement unit 44, and the average value of the propagation times measured by measurement unit 44 is obtained, thereby realizing necessary time resolution. That is, if the time resolution of measurement unit 44 is TA and the number of repetitions of the transmission/reception of the ultrasonic wave is M, measurement unit 44 is consecutively operated during a repetitive measurement, and thus the time resolution of the propagation time can be set to TA/M. Therefore, it is possible to realize the measurement of the propagation time with high accuracy when the pressure in fluid path 41 is stable.

However, when the flow-rate measurement device is applied to, for example, a gas meter which measures the flow rate of gas to be supplied as an energy source to home, there is an inherent problem which is called a pulsation phenomenon. The pulsation phenomenon is, for example, the phenomenon in which, as in an air conditioner using a gas engine which is called a GHP (Gas Heat Pump), the pressure in an ambient gas supply pipe fluctuates in synchronization with the rotation of the gas engine.

When the pulsation phenomenon occurs, even if a gas appliance is not used, gas moves in the gas supply pipe in synchronization with fluctuation in pressure. As a result, there is a problem in that the flow-rate measurement device detects the flow rate as if gas flows in the gas supply pipe.

Accordingly, as a method which suppresses the influence of the pulsation phenomenon, for example, a method described in PTL 1 has been suggested. According to the method of PTL 1, first, the number of repetitions M of the measurement is suppressed to the minimum number of times such that measurement accuracy can be maintained. Next, the number of repetition M of the measurement is set as a single measurement unit, a measurement interval is shortened, the measurement unit is executed N times consecutively for a comparatively long time little by little. The flow rate is calculated using the results of the measurement consecutively measured the N times, thereby reducing the influence of pulsation. At this time, in particular, if the measurement interval is sufficiently shorter than a pressure fluctuation period due to pulsation, it is possible to capture the phase state of the flow-velocity fluctuation waveform of the fluid evenly. The measured flow rates are averaged, thereby detecting the real flow velocity (flow rate) of the fluid with the fluctuation component due to pulsation removed.

However, when the above-described measurement method is constantly continued, while the influence of pulsation can be reduced, there is a problem in that power consumption increases.

Accordingly, in order to solve the above-described problem, for example, a method described in PTL 2 has been suggested. According to the method of PTL 2, in order to reduce power consumption, the number of measurements N is controlled in accordance with fluctuation in the flow rate of the fluid. Specifically, a measurement method has been suggested, in which, when the fluctuation in the flow rate of the fluid is small and it can be determined that there is no pulsation, the number of measurements N is reduced, and when fluctuation in the flow rate of the fluid is large and there is pulsation, the number of measurements N increases.

In the configuration of PTL 2, however, when pulsation does not occur, while power consumption can be reduced, there is no disclosure about a measurement method which reduces power consumption according to the magnitude of the flow rate of the fluid.

That is, for example, as in a gas meter which has a battery or the like as a drive source, in order to effectively use a limited amount of power resources, first, when there is no pulsation, power consumption is suppressed. When there is no influence on an integrated flow rate, that is, there is no fluid flow, there is a need for a method which suppresses the frequency of the flow-rate measurement operation, thereby reducing power consumption of the entire flow-rate measurement device.

PTL 1: Japanese Patent Unexamined Publication No. 2002-350202

PTL 2: Japanese Patent No. 3427839

SUMMARY OF THE INVENTION

A flow-rate measurement device of the invention includes a first transducer and a second transducer which are provided in a fluid flow path to transmit and receive an ultrasonic signal, a timer unit which measures a propagation time of the ultrasonic signal propagating between the first transducer and the second transducer, and a flow-rate calculation unit which executes a unit measurement step a predetermined number of times and calculates a flow rate of a fluid flowing in the fluid flow path on the basis of the propagation times measured the predetermined number of times, the unit measurement step being an operation in which a direction of transmission to reception between the first transducer and the second transducer is switched and the timer unit measures the propagation times of the ultrasonic signal in both directions. The flow-rate calculation unit measures the flow rate value of the fluid by a precise measurement step in which the unit measurement step is executed a plural number of times to calculate the flow-rate and an exploratory measurement step in which the unit measurement step is executed a smaller number of times than the number of executions in the precise measurement step to calculate the flow rate.

Therefore, it is possible to efficiently detect the presence/absence of the fluid flow. As a result, when there is no fluid flow, power consumption is reduced, and when there is a flow, power is used with concentration, thereby realizing a flow-rate measurement device which effectively distributes a limited amount of power resources.

DETAILED DESCRIPTION OF THE PREFERRED EMBODIMENTS

Hereinafter, exemplary embodiments of the present invention will be described with reference to the drawings. It should be noted that the present invention is not limited to the exemplary embodiments.

First Exemplary Embodiment

Hereinafter, a fluid measurement device according to a first exemplary embodiment of the present invention will be described with reference to FIG. 1.

Figure 1:
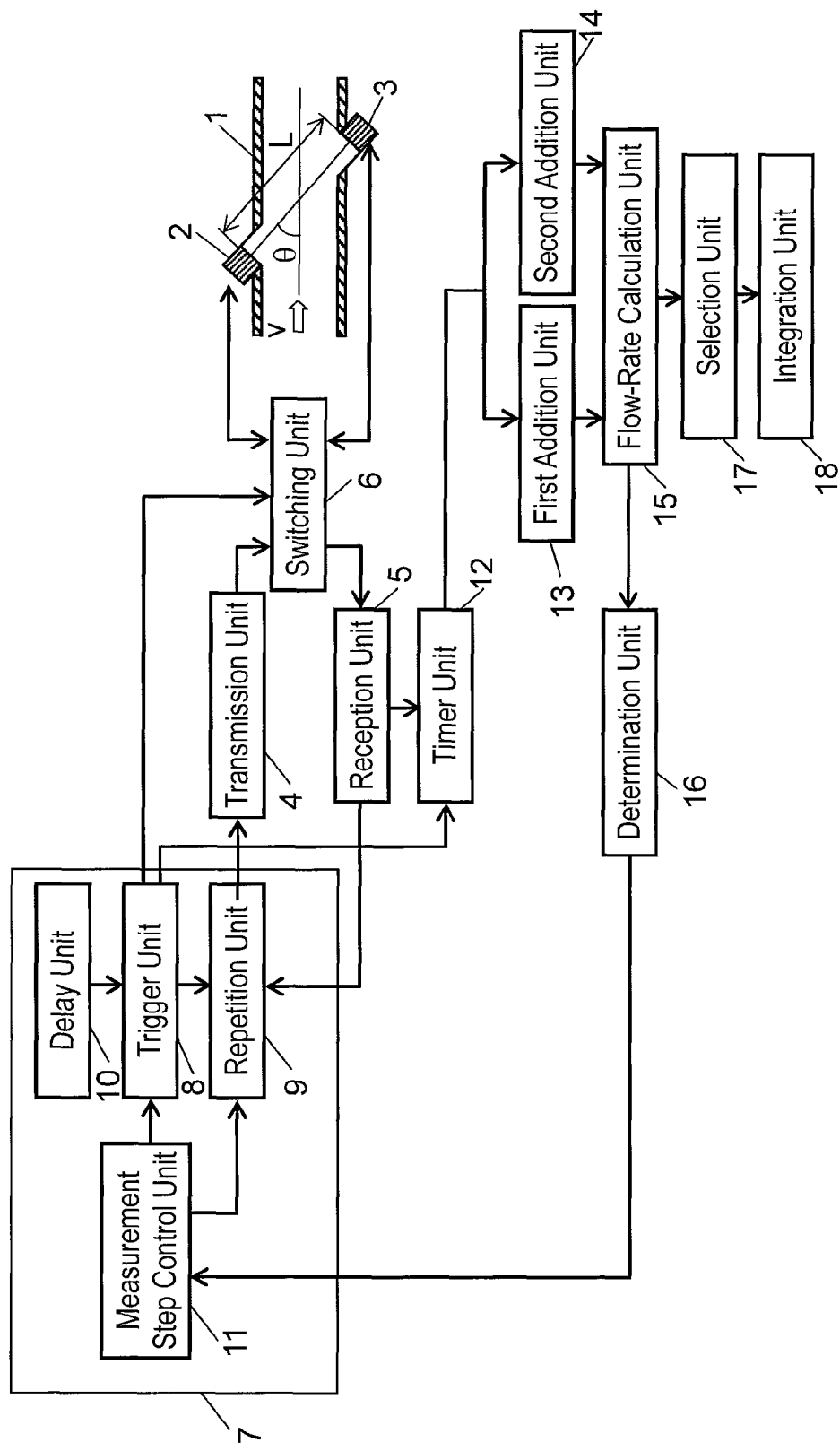
FIG. 1 is a block diagram of a flow-rate measurement device according to a first exemplary embodiment of the present invention.

FIG. 1 is a block diagram of the flow-rate measurement device according to the first exemplary embodiment of the present invention.

As shown in FIG. 1, the flow-rate measurement device of this exemplary embodiment includes at least first transducer 2 and second transducer 3 which are provided in fluid flow path 1, switching unit 6 which switches between signals of transmission unit 4 and reception unit 5, measurement control unit 7, first addition unit 13 and second addition unit 14 which integrate the measurement values of timer unit 12, flow-rate calculation unit 15, determination unit 16, selection unit 17, and integration unit 18.

Figure 6:
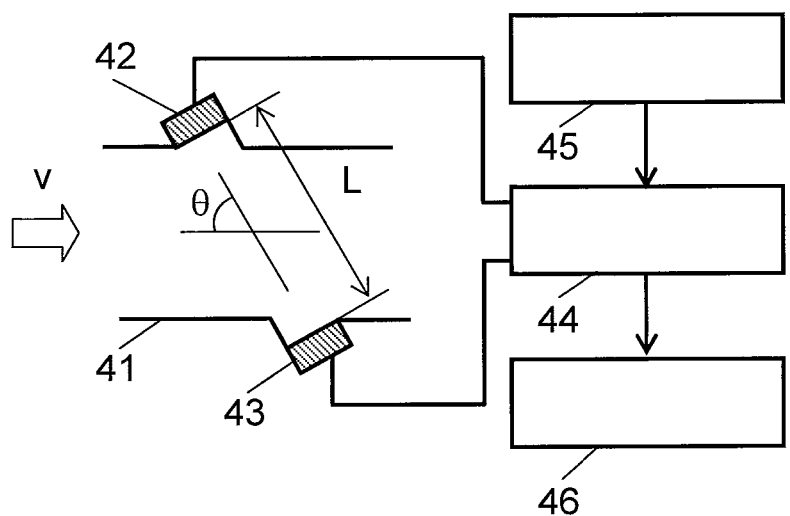
FIG. 6 is a block diagram of a flow-rate measurement device which uses a sing-around method of the related art.

First transducer 2 which transmits and receives an ultrasonic signal and second transducer 3 which receives and transmits the ultrasonic signal are arranged to be opposite to each other at a predetermined angle θ with respect to the flow direction of a fluid flowing in fluid flow path 1. Transmission unit 4 outputs a drive signal to first transducer 2, and first transducer 2 transmits (sends) the ultrasonic signal in response to the drive signal. The ultrasonic signal output from first transducer 2 is received by second transducer 3, and the signal received by the second transducer is input to reception unit 5 and subjected to signal processing. Switching unit 6 switches the connection of transmission unit 4 and reception unit 5 to first transducer 2 and second transducer 3 to switch the functions of transmission and reception of first transducer 2 and second transducer 3. Accordingly, the transmission and reception of the ultrasonic signal can be performed in first transducer 2 and second transducer 3 in both directions of the forward direction and the reverse direction of the fluid flow, and the measurement of the propagation time can be made by a relational expression described with reference to FIG. 6.

Measurement control unit 7 includes at least trigger unit 8, repetition unit 9, delay unit 10, and measurement step control unit 11, and controls the transmission and reception of the ultrasonic signal between first transducer 2 and second transducer 3.

Hereinafter, the operations of the transmission and reception of first transducer 2 and second transducer 3 will be specifically described focusing on a control operation of measurement control unit 7.

First, as shown in FIG. 1, if a trigger signal to start a measurement is output from trigger unit 8 to switching unit 6, switching unit 6 connects between first transducer 2 and transmission unit 4 and between second transducer 3 and reception unit 5. Accordingly, the measurement of the propagation time is started with first transducer 2 on a transmission side and second transducer 3 on a reception side. Hereinafter, the above-described connection configuration is referred to as a measurement in "the forward flow direction" and will be described.

Next, if a drive signal is output from transmission unit 4 to first transducer 2, an ultrasonic signal is output from first transducer 2. If the output ultrasonic signal reaches second transducer 3 and is received, reception unit 5 performs reception processing of the ultrasonic signal. At this time, if the reception processing is performed in reception unit 5 once, a sing-around measurement in "the forward flow direction" is executed with a predetermined number of repetitions set by repetition unit 9 having, for example, a counter or the like. Hereinafter, an example where the predetermined number of repetitions is 4 will be described.

Next, if the sing-around measurement in "the forward flow direction" with four repetitions is completed, a predetermined delay time is output from delay unit 10 to trigger unit 8. When the predetermined delay time has elapsed, trigger unit 8 outputs a transmission and reception switching signal to switching unit 6 to connect between second transducer 3 and transmission unit 4 and between first transducer 2 and reception unit 5. Accordingly, the measurement of the propagation time is started with second transducer 3 on a transmission side and first transducer 2 on a reception side. Hereinafter, the above-described connection configuration is referred to as a measurement in "the reverse flow direction" and will be described.

Next, in the above-described connection state, if a trigger signal to start a measurement is output from trigger unit 8 to switching unit 6, a drive signal is output from transmission unit 4 to second transducer 3, and an ultrasonic signal is output from second transducer 3. If the output ultrasonic signal reaches first transducer 2 and is received, reception unit 5 performs reception processing of the ultrasonic signal. At this time, if the reception processing is performed in reception unit 5 once, for example, a sing-around measurement in "the reverse flow direction" is executed a predetermined number of repetitions set by repetition unit 9 having, for example, a counter or the like. Accordingly, the measurement in "the reverse flow direction" in which the functions of transmission and reception of first transducer 2 and second transducer are switched is executed with four repetitions.

Although in this exemplary embodiment, an example where the number of repetitions is 4 has been described, the present invention is not limited thereto. For example, if the time resolution of timer unit 12 described below is sufficiently secured, a measurement may be performed once, not in a repetitive manner. A measurement may also be performed an arbitrary number of repetitions other than four in accordance with measurement accuracy of a necessary propagation time.

A sequence of operations in which the sing-around measurement (measurement with four repetitions) in "the forward flow direction", the predetermined delay time, and the sing-around measurement (measurement with four repetitions) in "the reverse flow direction" described above are alternately performed is referred to as a "unit measurement step" and will be described below.

Next, as will be described below in detail with reference to FIG. 2, the operations of a first measurement step which is a unit measurement step to be initially executed and a second measurement step comparable to the first measurement step with a predetermined delay time by the output of a delay signal from delay unit 10 are sequentially repeated. The above-described operations are repeated up to a final measurement step after a specified number of times through measurement step control unit 11. Accordingly, after the unit measurement step is executed a specified number of times from the first measurement step to the final measurement step, flow-rate calculation unit 15 calculates the flow rate of the fluid.

At this time, timer unit 12 measures the propagation time from the output timing of the trigger signal of trigger unit 8 to the end of the sing-around measurement. The propagation time accurately corresponds to the time which is obtained by multiplying the propagation time of the ultrasonic signal between the first transducer and the second transducer by the number of repetitions of the sing-around measurement.

First addition unit 13 integrates the measurement value of the propagation time of timer unit 12 during the measurement in "the forward flow direction" of each of a specified number of times (for example, N times) of the unit measurement step. Second addition unit 14 integrates the measurement value of the propagation time of timer unit 12 during the measurement in "the reverse flow direction" of each of a specified number of times (for example, N times) of the unit measurement step.

Next, if the operation of the unit measurement steps of the specified N times is completed, flow-rate calculation unit 15 calculates the flow rate value of the fluid using the output values of the measurement values of the propagation times integrated in first addition unit 13 and second addition unit 14. The flow rate value of the fluid to be calculated at this time is the average flow rate of the fluid while the unit measurement steps of the specified N times are executed.

Hereinafter, a sequence of operations including the first measurement step described above, the operation to the N-th measurement step which is the final measurement step corresponding to a case where the measurement step is repeated N times, and then flow-rate calculation unit 15 which calculates the flow rate of the fluid is referred to as a "unit flow-rate calculation step" and will be described.

The unit flow-rate calculation step has two modes having different functions of an exploratory measurement step in which the number of executions of the unit measurement step is small and a precise measurement step in which the number of executions of the unit measurement step is greater than the exploratory measurement step.

The exploratory measurement step is used for coarse determination on whether or not the fluid flows because the number of executions of the unit measurement step is small while measurement accuracy is low, such that a measurement can end in a short time. The precise measurement step is used for calculating the average flow rate of the fluid for every given time or the integrated flow rate of the fluid because measurement accuracy is higher than the exploratory measurement step while the number of executions of the unit measurement step is large.

Determination unit 16 determines the presence/absence of the flow rate of the fluid in accordance with the output value from flow-rate calculation unit 15 in the exploratory measurement step of the unit flow-rate calculation step, and outputs the determination result to measurement step control unit 11. Measurement step control unit 11 controls the operation of the fluid measurement device on the basis of the determination result of determination unit 16. The details will be described below.

On the basis of the calculation result of the flow rate of flow-rate calculation unit 15 which is executed in a given period (a given time), selection unit 17 determines the average flow rate value of the fluid in this period. The average flow rate value of the fluid determined by selection unit 17 is output to integration unit 18, and the total usage of the fluid is calculated by integration unit 18.

A fluid measurement device in which each unit is configured as described above, and the flow rate of the fluid is detected by the operation thereof is realized.

Hereinafter, the flow of the operation of each unit in the unit measurement step and the unit flow-rate calculation step described above will be specifically described with reference to FIG. 2.

Figure 2:
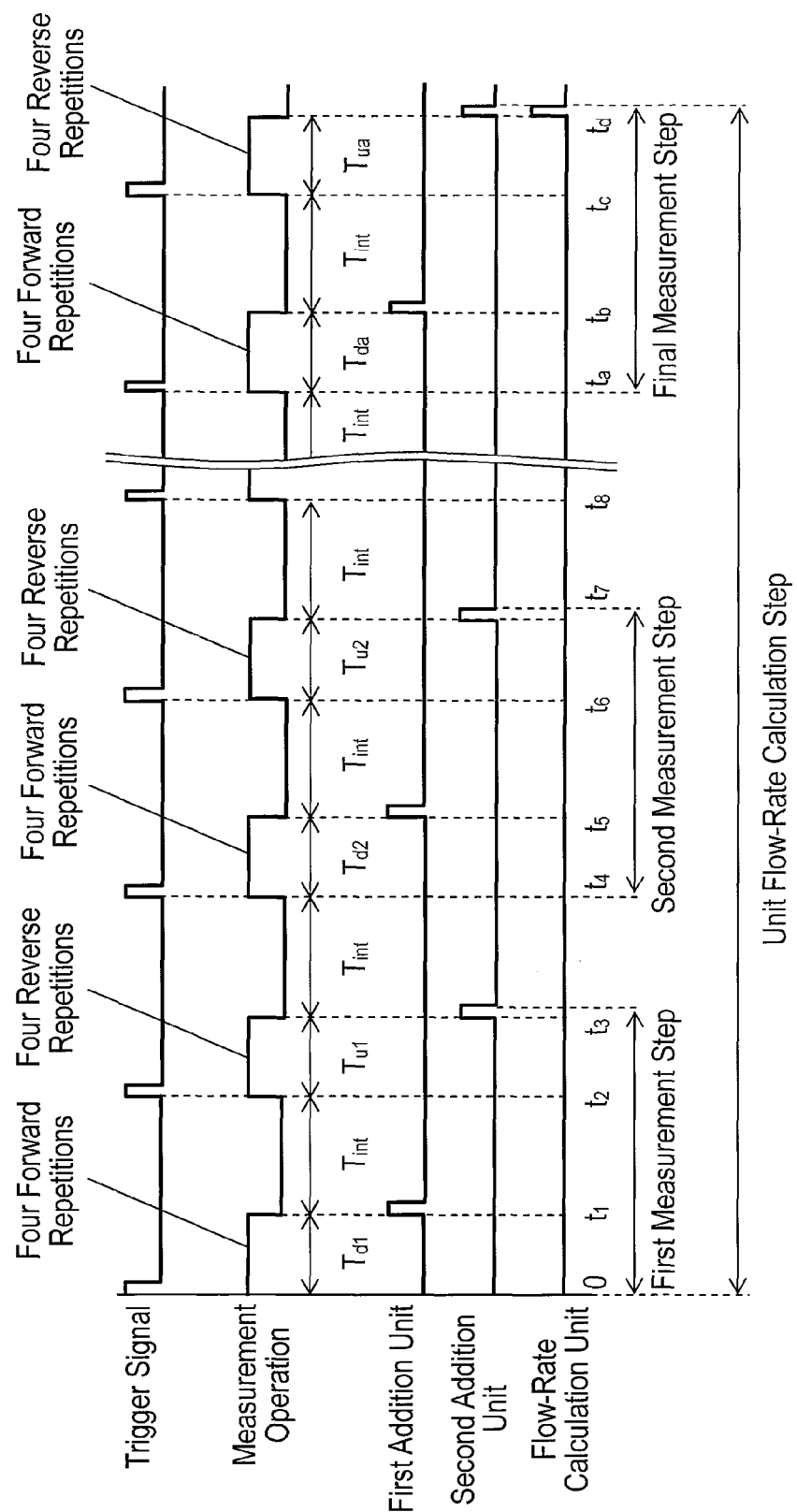
FIG. 2 is a time chart illustrating operations of a unit measurement step and a unit flow-rate calculation step of the flow-rate measurement device according to the first exemplary embodiment of the present invention.

FIG. 2 is a time chart illustrating the operations of the unit measurement step and the unit flow-rate calculation step of the flow-rate measurement device according to the first exemplary embodiment of the invention. In FIG. 2, with the timing of the trigger signal from trigger unit 8 representing the start of the measurement in "the forward flow direction" in the first measurement step serving as an initial unit measurement step as an origin, the horizontal axis represents an elapsed time, and the vertical axis represents the operation of each unit.

As shown in FIG. 2, first, the measurement in "the forward flow direction" of the first measurement step serving as an initial unit measurement step is executed up to the time t1 in synchronization with the trigger signal. At the time t1 of the first measurement step, a measurement value Td1 of the propagation time in "the forward flow direction" of the first measurement step measured by timer unit 12 is added in first addition unit 13.

Next, the measurement in "the reverse flow direction" of the first measurement step is started from the time t2 when a predetermined delay time Tint set by delay unit 10 has elapsed, and is executed up to the time t3. At the time t3 of the first measurement step, a measurement value Tu1 of the propagation time in "the reverse flow direction" of the first measurement step measured by timer unit 12 is added in second addition unit 14.

Thereafter, when the predetermined delay time Tint set by delay unit 10 has elapsed, the second measurement step is started.

After the second measurement step, similarly, each time the measurements in "the forward flow direction" and "the reverse flow direction" end, for example, a measurement value Td2 to a measurement value Tda and a measurement value Tu2 to a measurement value Tua are alternately added in first addition unit 13 and second addition unit 14. The measurement value Tda and the measurement value Tua represent the measurements values in the final measurement step corresponding to the a-th measurement step when the unit measurement step has been repeated a times.

Next, at the time td at which the unit measurement steps of a given number of times (in the above description, a times) end, the cross-sectional area of the fluid flow path is multiplied using the total value of the propagation times which are the measurement values of "the forward flow direction" and "the reverse flow direction" added in first addition unit 13 and second addition unit 14, where the flow rate of the fluid is calculated by flow-rate calculation unit 15.

Hereinafter, a method of calculating the flow rate of the fluid which is performed by flow-rate calculation unit 15 will be specifically described.

First, flow-rate calculation unit 15 obtains a propagation time t12 and a propagation time t21 as an average value per measurement from the measurement values added and held by first addition unit 13 and second addition unit 14.

Next, the flow velocity v of the fluid is obtained using (Expression 3) described in the background art.

A necessary coefficient is multiplied to the obtained flow velocity v to obtain the flow rate value of the fluid. At this time, as the coefficient, there are the cross-sectional area of the fluid flow path, a flow-rate correction coefficient for correcting the flow velocity of the fluid to a real average flow velocity, and the like.

That is, the time interval shown in FIG. 2 from the time t=0 to the time td at which the flow rate is calculated corresponds to the unit flow-rate calculation step.

Hereinafter, the relationship between the precise measurement step and the exploratory measurement step constituting the unit flow-rate calculation step will be described with reference to FIGS. 3A and 3B in addition to FIG. 1 while comparing "presence of flow rate" and "absence of flow rate".

Figure 3:
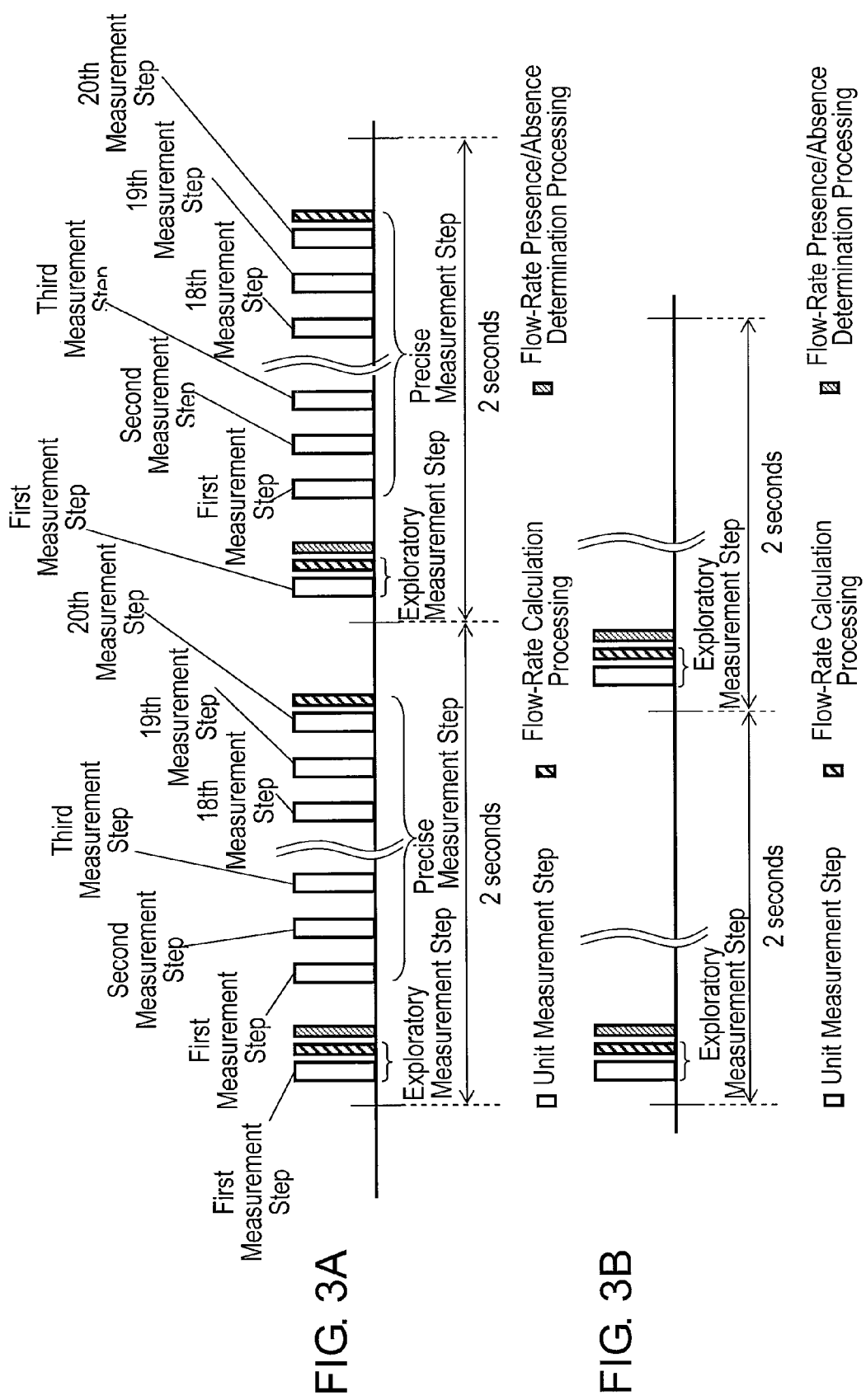
FIG. 3A is a time chart illustrating operations of an exploratory measurement step and a precise measurement step of a flow-rate measurement device at the time of the presence of a flow rate according to an exemplary embodiment of the present invention.
FIG. 3B is a time chart illustrating an operation of an exploratory measurement step of a flow-rate measurement device at the time of the absence of a flow rate according to an exemplary embodiment of the present invention.

FIG. 3A is a time chart illustrating the operations of the exploratory measurement step and the precise measurement step of the flow-rate measurement device at the time of the presence of the flow rate according to the first exemplary embodiment of the present invention. FIG. 3B is a time chart illustrating the operation of the exploratory measurement step of the flow-rate measurement device at the time of the absence of the flow rate according to the first exemplary embodiment of the present invention. Specifically, each of the unit measurement step, flow-rate calculation processing, and flow-rate presence/absence determination processing shown in FIG. 3A and FIG. 3B is indicated by a rectangle in the drawing as a single processing block, and how a sequence of processing is executed is shown in a time chart.

The term "presence of flow rate" means that the fluid flow is generated, and the term "absence of flow rate" means that there is no fluid flow.

Although in FIGS. 3A and 3B, a case whether N=1 in the exploratory measurement step and N=20 in the precise measurement step as an example of the number of executions (number of repetitions) N of the unit measurement step has been described, the present invention is not limited thereto.

As shown in FIGS. 3A and 3B, the unit flow-rate calculation step is executed by measurement control unit 7 in a given time, for example, with measurement processing of 2 seconds as one section, and the unit flow-rate calculation step is executed once or twice, whereby the flow rate or the like of the fluid is measured.

At the head of the measurement period (given time) shown in FIGS. 3A and 3B, first, the exploratory measurement step having the first measurement step serving as the unit measurement step and the flow-rate calculation processing is executed.

At this time, in the exploratory measurement step, the unit measurement step is only executed once. For this reason, for example, if the same flow rate is continued, since variation in the measurement result increases, when discriminating slight change in the flow rate of the fluid, it is difficult to execute the measurement with sufficient measurement accuracy. However, it is possible to appropriately set a predetermined value which is a threshold value of the flow rate of the fluid to determine the presence/absence of the fluid flow.

Accordingly, after the exploratory measurement step has been executed, determination unit 16 performs the flow-rate presence/absence determination processing for determining the presence/absence of the flow rate on the basis of the magnitude relationship between the output result of flow-rate calculation unit 15 and the predetermined value. The predetermined value is a value which is specified in accordance with the standard of the flow-rate measurement device or the like, and corresponds to, for example, the flow rate of about 3 L/h.

As shown in FIG. 3A, in the flow-rate presence/absence determination processing, when the determination result of determination unit 16 is "presence of flow rate", after the flow-rate presence/absence determination processing, measurement control unit 7 executes the precise measurement step. At this time, in the precise measurement step, the flow rate of the fluid is calculated using the average value of the measurement values measured by the unit measurement steps of 20 times. For this reason, in the precise measurement step, it becomes possible to obtain the flow rate of the fluid with high accuracy compared to, for example, the exploratory measurement step having the single unit measurement step.

Meanwhile, as shown in FIG. 3B, in the flow-rate presence/absence determination processing, when the determination result of determination unit 16 is "absence of flow rate", after the flow-rate presence/absence determination processing, measurement control unit 7 is stopped until the 2 seconds section of the next unit flow-rate calculation step is reached, without executing the precise measurement step.

Accordingly, when it is determined that there is no fluid flow, the measurement operation is stopped, thereby reducing power consumption and distributing power to the measurement operation of the precise measurement step which is executed when there is a fluid flow. As a result, for example, it becomes possible to effectively use a limited amount of power resources, such as a battery.

Hereinafter, another method which further reduces power consumption in the unit flow-rate calculation step will be described. Specifically, it is possible to further reduce power consumption by simplifying the flow-rate presence/absence determination processing in determination unit 16.

That is, as described in (Expression 4), the difference in the propagation time between "the forward flow direction" and "the reverse flow direction" is approximately proportional to the flow rate of the fluid.

Accordingly, subtraction processing corresponding to the numerator of (Expression 4) is executed from the relationship between the difference in the propagation time and the flow rate value without using (Expression 3). Therefore, it becomes possible to determine the presence/absence of the flow rate of the fluid from the magnitude of the calculation result of the numerator of (Expression 4).

Specifically, first, flow-rate calculation unit 15 calculates a physical quantity corresponding to the difference in the propagation time using the following (Expression 5) when the exploratory measurement step is executed.

$$Tdif1 = Tu1 - Td1 \quad \text{(Expression 5)}$$

The values of $Tu1$ and $Td1$ in (Expression 5) are defined by the description of FIG. 2.

$Td1$ of (Expression 5) is the integration result of the propagation times of the sing-around measurement in "the forward flow direction" obtained with four repetitions. Similarly, $Tu1$ of (Expression 5) is the integration result of the propagation times of the sing-around measurement in "the reverse flow direction" obtained with four repetitions.

That is, the value of $Tdif1$ of (Expression 5) is obtained as the difference four times greater than the propagation time.

Accordingly, the value of $Tdif1$ obtained by (Expression 5) is compared with a predetermined value set in advance on the basis of the result of an experiment or the like, making it possible to determine the presence/absence of the flow rate of the fluid. Therefore, it is possible to determine the presence/absence of the flow rate by executing comparatively simple calculation, thereby reducing power consumption for the following reason. Although the predetermined value is usually determined by the flow rate of the fluid, and in the above-described case, differs in the cross-section of the fluid flow path, the predetermined value corresponds to the time that the fluid flows at the flow rate of 3 L/h.

Hereinafter, the reason that power consumption can be reduced will be described from the determination of the flow rate of (Expression 5).

In the exploratory measurement step of the unit flow-rate calculation step, when determining the presence/absence of the flow rate from a calculation expression using (Expression 3), first, in regard to the value of $Tdif1$ of (Expression 5), averaging processing for obtaining the average values by dividing the values of the sing-around measurements of four times as the number of repetitions by 4 is required. Next, the average values of the propagation times obtained by the averaging processing are substituted with $t12$ and $t21$ of (Expression 3), and multiplication/division processing is performed.

At this time, since the multiplication/division processing of (Expression 3) has a processing time longer than the addition/subtraction processing of (Expression 5), power consumption increases.

Accordingly, if the presence/absence of the flow rate of the fluid is determined using (Expression 5), it is possible to significantly reduce power consumption. In particular, in the case of an appliance which requires the flow-rate measurement device having the life time of about ten years, such as a household gas meter or the like which uses a general battery as a power source, the reduction in power consumption is considerably effective for the life time or the like.

Although in the above description, a method which determines the presence/absence of the flow rate of the fluid and measures the flow rate value in the unit flow-rate calculation step has been described, hereinafter, integration processing for obtaining the total usage of the fluid will be described.

As shown in FIGS. 3A and 3B, in all the measurements of "presence of flow rate" and "absence of flow rate", the single unit flow-rate calculation step is necessarily executed in a given time (for example, 2 seconds).

Accordingly, selection unit 17 shown in FIG. 1 outputs one of the flow rate values of "presence of flow rate" and "absence of flow rate" obtained by the unit flow-rate calculation step to integration unit 18 as the average flow rate of the section for the given time (2 seconds).

At this time, in the case of "presence of flow rate" of FIG. 3A, the flow rate value of the fluid obtained by flow-rate calculation unit 15 in the precise measurement step is set as the average flow rate of the section for the given time. Therefore, when there is a flow, it is ensured that the flow rate of the fluid is measured with high accuracy.

Meanwhile, in the case of "absence of flow rate" of FIG. 3B, the average flow rate of zero is output to integration unit 18 regardless of the flow rate value of the fluid obtained by flow-rate calculation unit 15. At this time, in the case of "absence of flow rate" of FIG. 3B, since the calculation of the flow rate itself by flow-rate calculation unit 15 can be omitted, it is possible to further reduce power consumption in the unit flow-rate calculation step.

Although in this exemplary embodiment, a case where, in the cases of "presence of flow rate" of FIG. 3A and "absence of flow rate" of FIG. 3B, the time interval from the start point of the section for the given time (for example, 2 seconds) to the start time of the initial exploratory measurement step is identical has been described, the invention is not limited thereto. For example, the time interval may be random taking into consideration periodic fluctuation in the flow rate of the fluid due to pulsation or the like. At this time, the time interval is short when the pulsation period is short, and is long when the pulsation period is long. Accordingly, it is possible to suppress the influence of the pulsation phenomenon of the fluid, thereby realizing a measurement with higher accuracy. At this time, even when the time interval is random, the condition that the single or two unit flow-rate calculation steps are completed in the section for the given time (for example, 2 seconds) is the same as FIGS. 3A and 3B. The condition that the time interval is random means the time interval from the start point of the section to the start time of the initial exploratory measurement step when the time interval of the section of the single unit flow-rate calculation step is fixed to 2 seconds.

As described above, the flow-rate measurement device of the present invention includes the determination unit which determines the presence/absence of the flow rate of the fluid from the magnitude of the flow rate value obtained by the exploratory measurement step of the unit flow-rate calculation step, wherein, only when the determination unit determines to be the presence of the flow rate, the precise measurement step is executed. For this reason, when it is determined that there is no fluid flow, the measurement operation is stopped, thereby reducing power consumption and distributing power to the measurement operation of the precise measurement step which is executed when there is a fluid flow. As a result, it is possible to effectively use a limited amount of power resources of, for example, a battery or the like.

In the flow-rate measurement device of the present invention, the flow-rate calculation unit calculates the difference between the propagation times in both directions of "the forward flow direction" and "the reverse flow direction" to determine the flow rate of the fluid in the exploratory measurement step. When the difference in the propagation time obtained by the flow-rate calculation unit is smaller than a predetermined value, the determination unit determines to be the absence of the flow rate, and the calculation of the flow rate is omitted. Therefore, in the determination on the presence/absence of the flow rate of the fluid, it is possible to reduce the number of executions of multiplication/division having a long calculation processing time of a calculation processing unit, thereby reducing power consumption. Although the predetermined value is usually determined by the flow rate of the fluid, and in the above-described case, differs in the cross-section of the fluid flow path, for example, the predetermined value corresponds to the time that the fluid flows at the flow rate of 3 L/h.

In the flow-rate measurement device of the invention, when the determination unit determines that there is no fluid flow, since the output of the flow-rate calculation unit is set to zero such that the processing for calculating the flow rate is not performed, it is possible to further reduce power consumption when there is no flow. Specifically, although there is processing for enabling a power saving mode, such as sleep, up to the start of the next section after the processing for calculating the flow rate, if the calculation processing is not performed, it is possible to suppress power consumption as much.

In the flow-rate measurement device of the present invention, when the precise measurement step has been executed, the selection unit selects the flow rate value obtained in the precise measurement step as the average flow rate value of the fluid. As a result, it is possible to measure the flow rate of the fluid with high accuracy when there is a fluid flow.

Second Exemplary Embodiment

Hereinafter, a fluid measurement device according to a second exemplary embodiment of the present invention will be described with reference to the drawings.

The overall configuration of the fluid measurement device of this exemplary embodiment is the same as FIG. 1 shown in the first exemplary embodiment. Since the operation of the unit flow-rate calculation step is the same as the first exemplary embodiment described with reference to FIG. 2, detailed description will not be repeated.

That is, this exemplary embodiment is different from the first exemplary embodiment in that the operation to switch between the exploratory measurement step and the precise measurement step in the measurements of "presence of flow rate" of FIG. 3A and "absence of flow rate" of FIG. 3B is different, and will be specifically described with reference to FIGS. 4 and 5.

Figure 4:
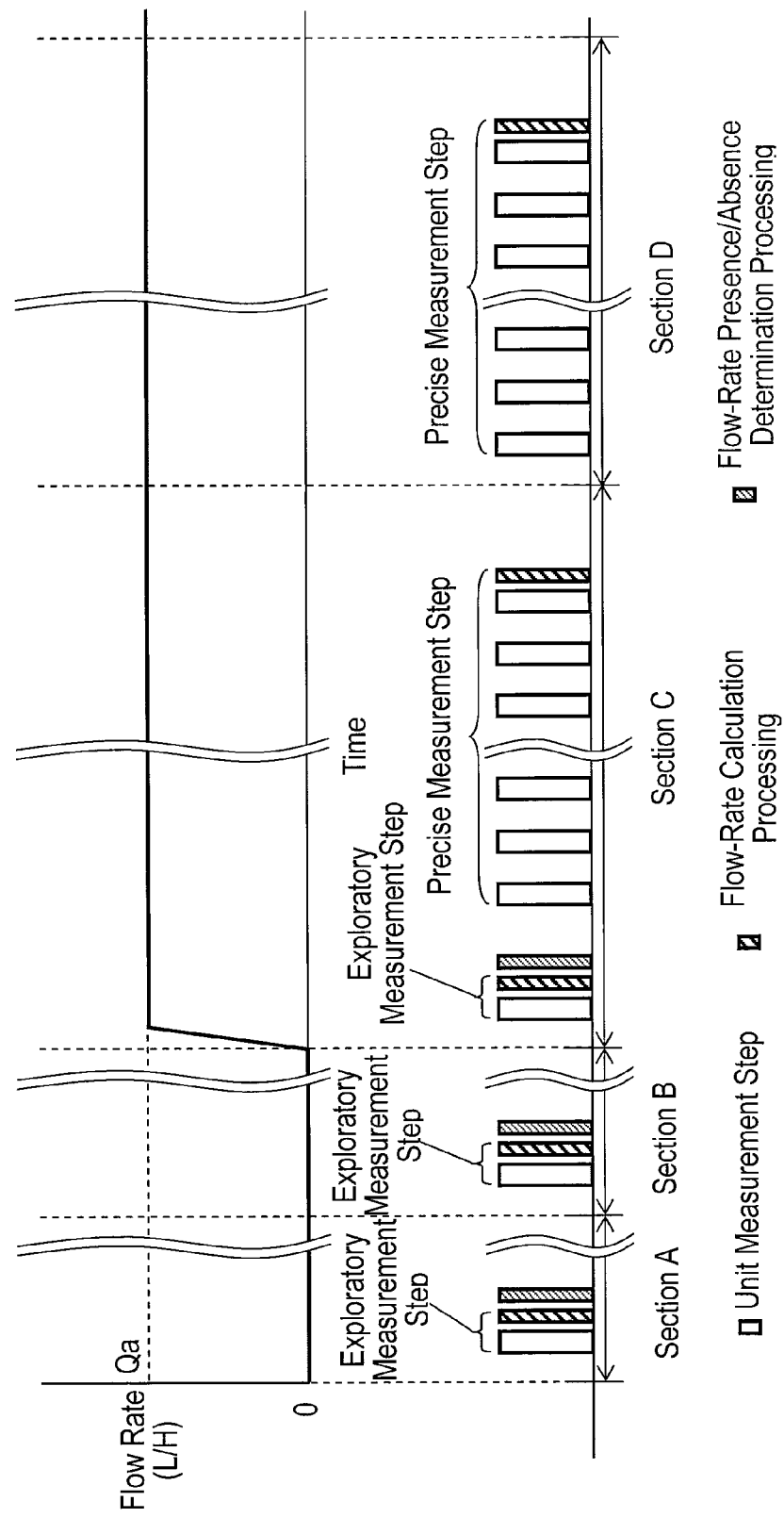
FIG. 4 is a time chart illustrating an operation to switch between an exploratory measurement step and a precise measurement step of a flow-rate measurement device according to a second exemplary embodiment of the present invention.

FIG. 4 is a time chart illustrating the operation to switch between the exploratory measurement step and the precise measurement step in the flow-rate measurement device according to the second exemplary embodiment of the present invention. FIG. 5 is another time chart illustrating the operation to switch between the exploratory measurement step and the precise measurement step of the flow-rate measurement device according to the second exemplary embodiment of the present invention.

Figure 5:
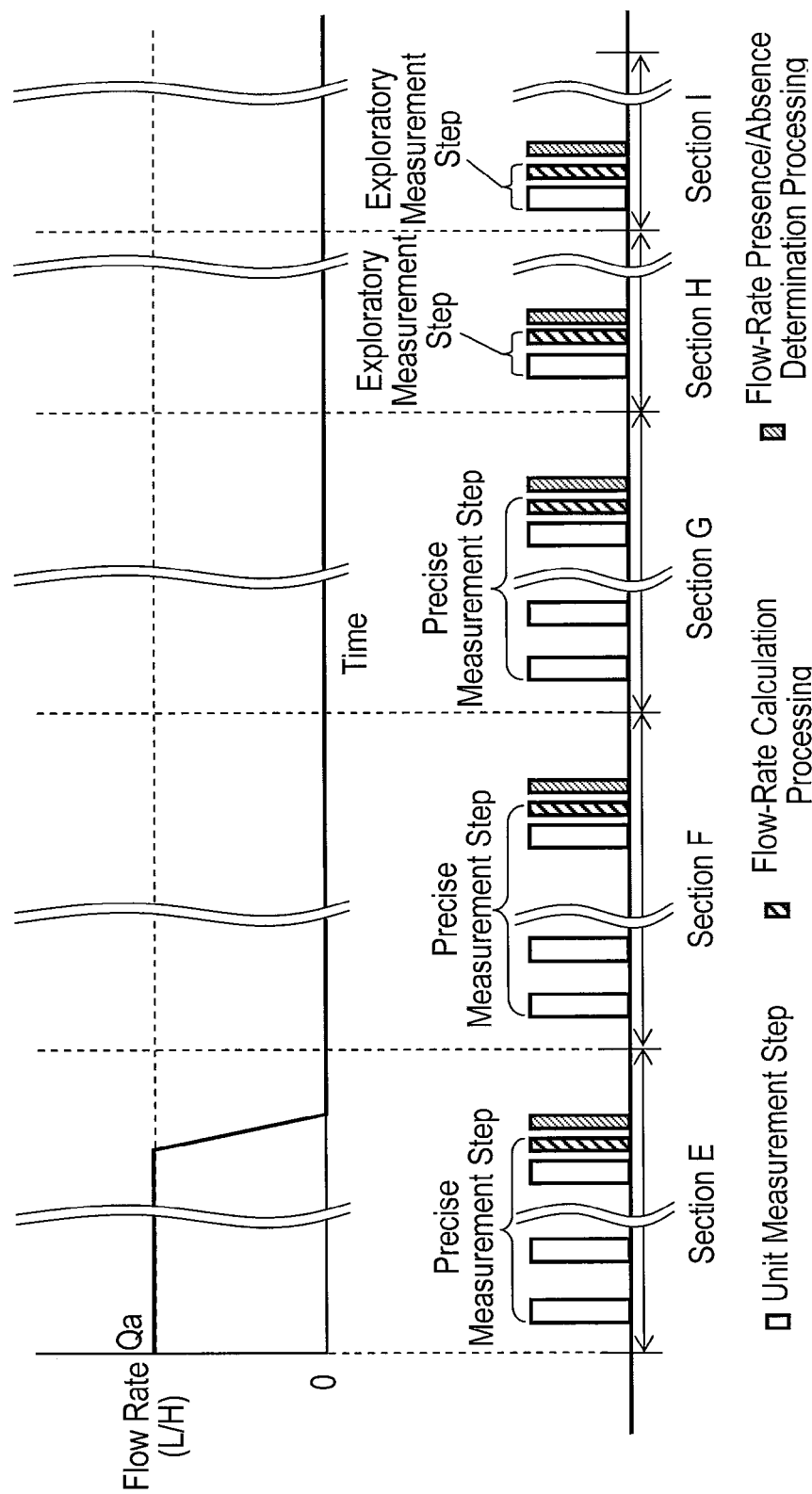
FIG. 5 is another time chart illustrating an operation to switch between an exploratory measurement step and a precise measurement step of the flow-rate measurement device according to the second exemplary embodiment of the present invention.

FIGS. 4 and 5 illustrate the relationship between the flow rate of the fluid and the switching between the measurement steps in a comparison manner. Sections A to I shown in the drawings represent the unit flow-rate calculation step with a section width for a given time (for example, 2 seconds). The average flow rate and the integrated flow rate of the fluid are measured and updated for each section.

First, an operation shown in FIG. 4 when the determination result of determination unit 16 is switched from "absence of flow rate" to "presence of flow rate" will be described.

As shown in FIG. 4, in the section A and the section B, since the flow rate is zero and the fluid flow is not generated, the determination result of the determination unit 16 becomes "absence of flow rate". For this reason, in the section A and the section B, as in the first exemplary embodiment, the operation of the precise measurement step is omitted.

Next, in the section C, if the fluid flow at the flow rate Qa (L/h) is generated, the determination result of determination unit 16 is changed to "presence of flow rate". For this reason, the precise measurement step in which the flow rate is measured is executed in the section C subsequently to the exploratory measurement step.

Next, in the section D, since the flow rate Qa (L/h) generated in the section C is continuously generated, after the precise measurement step in the section C is executed, the operation of the exploratory measurement step in the section D is omitted, and only the precise measurement step is executed to measure the flow rate of the fluid.

Accordingly, after the flow rate of the fluid in the exploratory measurement step of a certain section is detected, the operation of the exploratory measurement step can be omitted in subsequent sections, making it possible to reduce power consumption.

The above-described operation is continued unless the flow rate becomes zero.

Thereafter, a case where the fluid flow is stopped will be described in connection to an operation when the determination result of determination unit 16 shown in FIG. 5 is switched from "presence of flow rate" to "absence of flow rate".

As shown in FIG. 5, since the fluid flow is stopped in the section F and the section G, the flow rate value of the fluid obtained by the precise measurement step in both sections becomes zero or a value close to zero.

Accordingly, when the result of the calculation of the flow rate by the precise measurement step is smaller than a predetermined value of the flow rate of the fluid, for example, consecutively two times, determination unit 16 determines to the "absence of flow rate". The operation of the exploratory measurement step is restarted from the next section H. The predetermined value is a value which is specified in accordance with the standard of the flow-rate measurement device or the like, and corresponds to, for example, the flow rate of 3 L/h.

Although in this exemplary embodiment, as the determination condition of "absence of flow rate" in the calculation of the flow rate, an example where a value equal to or smaller than a predetermined value is detected consecutively two times has been described, the invention is not limited thereto. The condition that the number of times of the detection is two is to increase the reliability for the determination of "absence of flow rate", it is obvious that the number of times of the detection is not limited to two. For example, the determination may be only made once.

Although in this exemplary embodiment, in FIGS. 4 and 5, a case where the time interval from the start point of the section for the given time (for example, 2 seconds) to the start time of the unit measurement step is identical has been described, the invention is not limited thereto. For example, the time interval may be random taking into consideration periodic fluctuation in the flow rate of the fluid due to pulsation or the like. Accordingly, it is possible to suppress the influence of the pulsation phenomenon of the fluid, thereby realizing a measurement with higher accuracy. At this time, even when the time interval is random, the condition that the single or two unit flow-rate calculation steps are completed in the section for the given time (for example, 2 seconds) is the same as FIGS. 4 and 5. The condition that the time interval is random means the time interval from the start point of the section to the start time of the initial exploratory measurement step when the time interval of the section of the single unit flow-rate calculation step is fixed to 2 seconds is arbitrary.

According to this exemplary embodiment, as shown in FIG. 4, even when the exploratory measurement step is stopped, the operation of the exploratory measurement step can be restarted by the operation shown in FIG. 5 to measure the flow rate. Therefore, it is possible to appropriately switch between the exploratory measurement step and the precise measurement step in accordance with, for example, the flow rate of the fluid depending on the usage of gas or the like, thereby measuring the flow rate. As a result, it is possible to realize a flow-rate measurement device which stably operates over a long period of time effectively using a limited amount of power resources of a battery or the like.

According to this exemplary embodiment, as shown in FIG. 4, after a measurement by the precise measurement step has been started, the execution of the exploratory measurement step is stopped. As a result, when the flow rate is consecutively detected, it is possible to reduce power consumption.

According to this exemplary embodiment, as shown in FIG. 4, after the measurement by the precise measurement step has been started, the execution of the exploratory measurement step is stopped, and as shown in FIG. 5, when the result of the measurement by the precise measurement step is smaller than a predetermined flow rate value, the execution of the exploratory measurement step is restarted. As a result, it is possible to realize a flow-rate measurement device which can measure the flow rate while appropriately switching a measurement method in accordance with the presence/absence of the flow rate.

A flow-rate measurement device according to the present invention includes a first transducer and a second transducer which are provided in a fluid flow path to transmit and receive an ultrasonic signal, a timer unit which measures a propagation time of the ultrasonic signal propagating between the first transducer and the second transducer, and a flow-rate calculation unit which executes a unit measurement step a predetermined number of times and calculates a flow rate of a fluid flowing in the fluid flow path on the basis of the propagation times measured the predetermined number of times, the unit measurement step being an operation in which a direction of transmission to reception between the first transducer and the second transducer is switched and the timer unit measures the propagation times of the ultrasonic signal in both directions. The flow-rate calculation unit measures a flow rate value of the fluid by a precise measurement step in which the unit measurement step is executed a plural number of times to calculate the flow-rate and an exploratory measurement step in which the unit measurement step is executed a smaller number of times than the number of executions in the precise measurement step to calculate the flow rate. Therefore, it is possible to efficiently detect the presence/absence of the fluid flow. As a result, when there is no fluid flow, power consumption is reduced, and when there is a flow, power is used with concentration, thereby realizing a flow-rate measurement device which effectively distributes a limited amount of power resources.

The precise measurement step is executed only when the flow rate value of the fluid obtained in the exploratory measurement step is equal to or greater than a predetermined value. Therefore, it is possible to effectively reduce power consumption when there is no fluid flow.

When the flow rate value of the fluid obtained in the exploratory measurement step is smaller than a predetermined value, an output of the flow-rate calculation unit is set to zero. Therefore, it is possible to further reduce power consumption when there is no fluid flow.

The precise measurement step is executed only when a difference between the propagation times in both directions detected in the exploratory measurement step is equal to or greater than a predetermined value. Therefore, when determining the presence/absence of the flow rate, the number of executions of multiplication/division with a long calculation processing time is reduced, thereby reducing power consumption.

When the difference between the propagation times in both directions obtained in the exploratory measurement step is smaller than a predetermined value, an output of the flow-rate calculation unit is set to zero. Therefore, since the output of the flow-rate calculation unit is set to zero, it is possible to further reduce power consumption when there is no fluid flow.

The flow-rate measurement device according to the present invention further includes a selection unit selects the calculated flow rate value as an average flow rate within the given time by executing either the exploratory measurement step or the precise measurement step at least once within a given time, and calculating the flow rate value of the fluid, wherein, when the precise measurement step has been executed, the selection unit selects the flow rate value of the fluid obtained in the precise measurement step. Therefore, when there is a fluid flow, it is possible to measure the flow velocity of the fluid with high accuracy.

After measurement by the precise measurement step has been started, the execution of the exploratory measurement step is stopped. Therefore, it is possible to reduce power consumption when the flow rate of the fluid is consecutively generated.

When a result of the measurement by the precise measurement step is smaller than a predetermined flow rate value of the fluid, the execution of the exploratory measurement step is restarted. Therefore, it is possible to measure the flow rate while appropriately switching a measurement method in accordance with the presence/absence of the flow rate of the fluid.

INDUSTRIAL APPLICABILITY

Since it is possible to realize a flow-rate measurement device which measures the presence/absence of the flow rate of the fluid instantly and is highly responsive in accordance with the presence/absence of the flow rate, the present invention can be applied to a wide field including not only a gas meter but also a gas flow meter or a liquid flow meter.

The invention claimed is:

1. A flow-rate measurement device comprising:
    a first transducer and a second transducer which are provided in a fluid flow path to transmit and receive an ultrasonic signal;
    a timer unit which measures a propagation time of the ultrasonic signal propagating between the first transducer and the second transducer; and
    a flow rate calculation unit which executes a unit measurement step a predetermined number of times and calculates a flow rate of a fluid flowing in the fluid flow path on the basis of the propagation times measured the predetermined number of times,
    the unit measurement step comprising an operation in which a direction of transmission to reception between the first transducer and the second transducer is switched and the timer unit measures the propagation times of the ultrasonic signal in both directions,
    wherein the flow-rate calculation unit measures a flow rate value of the fluid by first completing an exploratory measurement step, and, secondly, an optional precise measurement step in which the unit measurement step is executed a plural number of times to calculate the flow rate,
    where, in the exploratory measurement step, the unit measurement step is executed a smaller number of times than the plural number of executions in the precise measurement step, and
    the execution of the exploratory measurement step is restarted when a flow rate absence in the fluid flow path is indicated based on a difference in the propagation times of the ultrasonic signal in both directions that is below a predetermined time value, such that power consumption of the flow-rate measurement device is low.

2. The flow-rate measurement device of claim 1, wherein the precise measurement step is executed only when the flow rate value of the fluid obtained in the exploratory measurement step is equal to or greater than a predetermined value.

3. The flow-rate measurement device of claim 1, wherein, when the flow rate value of the fluid obtained in the exploratory measurement step is smaller than a predetermined value, an output of the flow-rate calculation unit is set to zero.

4. The flow-rate measurement device of claim 1, wherein the precise measurement step is executed only when a difference between the propagation times in both directions detected in the exploratory measurement step are equal to or greater than a predetermined value.

5. The flow-rate measurement device of claim 1, wherein, when a difference between the propagation times in both directions obtained in the exploratory measurement step is smaller than the predetermined time value, the output of the flow-rate calculation unit is set to zero.

6. The flow-rate measurement device of claim 1, further comprising: a selection unit that selects the calculated flow rate value as an average flow rate within the given time by executing either the exploratory measurement step or the precise measurement step at least once within a given time, and calculating the flow rate value of the fluid, wherein, when the precise measurement step has been executed, the selection unit selects the flow rate value of the fluid obtained in the precise measurement step.

7. The flow-rate measurement device of claim 1, wherein, after measurement by the precise measurement step has been started, the execution of the exploratory measurement step is stopped.

* * * * *